April 18, 1961 J. W. ANDERSON 2,979,750
DEVICE FOR A WINDSHIELD WIPER BLADE AND ARM ASSEMBLY
Filed July 11, 1956
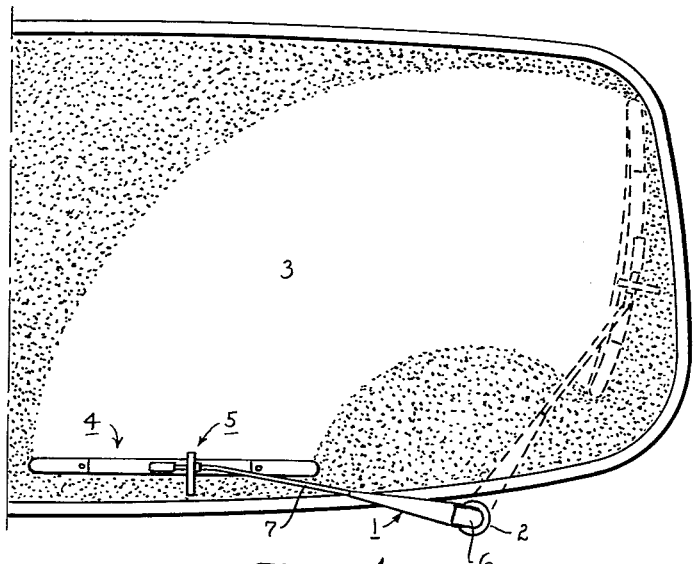
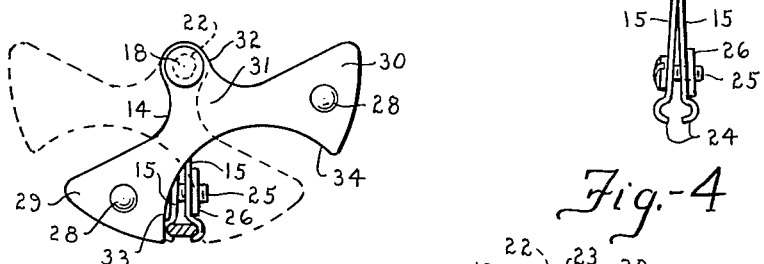
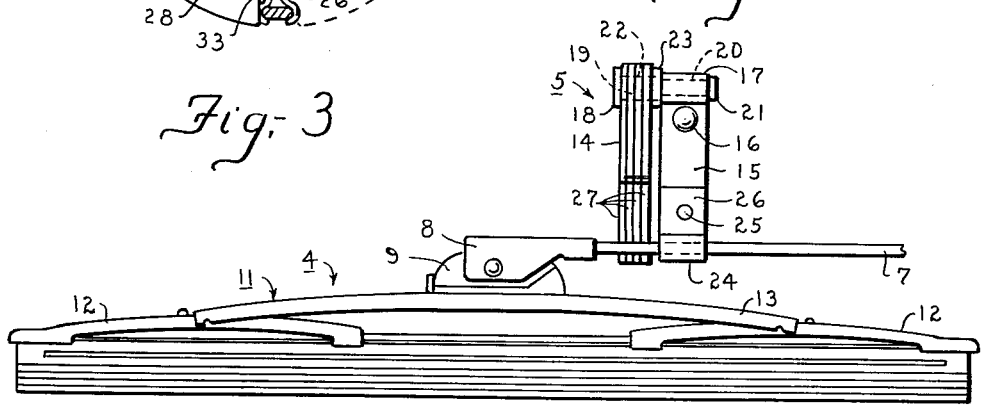
INVENTOR.
JOHN W. ANDERSON
BY
Charles S. Penfold
ATTORNEY United States Patent Office 2,979,750
Patented Apr. 18, 1961

2,979,750

DEVICE FOR A WINDSHIELD WIPER BLADE
AND ARM ASSEMBLY

John W. Anderson, 578 Broadway, Gary, Ind.

Filed July 11, 1956, Ser. No. 597,125

14 Claims. (Cl. 15—250)

The invention relates generally to windshield wiper blades and more particularly is directed to improved means for removing snow, ice, sleet or any other objectionable matter from a blade and/or arm during movement of the latter back and forth across a windshield.

The invention may be utilized in conjunction with a blade for wiping only flat surfaces and is also adapted to release, by reaction to impact, foreign matter from a blade unit of the type which includes a flexible blade and a pressure device comprising a plurality of relatively movable members or yokes operatively connected to the blade unit in a manner whereby the blade can readily conform to the curved surface of a windshield. In the latter type or blade, snow or ice, depending on weather conditions, may accumulate and pack between and on the units and thereby render the blade inoperative for proper wiping.

With the foregoing in mind, the principal object of the invention is to provide shock-producing means comprising a device having an impact member preferably in the form of a hammer or knocker which is preferably adapted for detachable connection with a wiper arm unit.

The device embodying the invention preferably includes a support unit or assembly in the form of a clamp adapted for connection with a wiper arm unit and a knocker which is well-balanced for free pivotal or rockable movement on the support for striking the arm as it changes in speed or direction of movement. In other words, when there is any appreciable or abrupt change in the momentum or direction of movement of the wiper arm and blade, it causes the knocker to swing and strike against the arm unit and impart sufficient shock or vibration thereto and to the blade unit to loosen and release snow or ice thereon and/or prevent or retard its accumulation.

An important object of the invention is to provide a unique method of automatically removing snow or other extraneous matter from a windshield wiper arm-and-blade assembly which consists in causing impact means connected to and propelled by said assembly to transmit force of its momentum into inertial shock to the blade upon occurrence of irregularities or reversals in the travel of the assembly.

A significant object of the invention is to provide a device which operates efficiently and automatically in response to operative movements of the arm and is substantially unaffected in its operation by snow or ice.

A specific object of the invention is to provide a device having a knocker which is preferably bifurcated to straddle the arm so that portions of the knocker on opposite sides of the arm will alternately strike the arm as it oscillates back and forth across the windshield.

A further object of the invention is to provide a device having impact means or a knocker which, due to its weight, assists in shoving wet or packed snow outwardly at either side of the area of vision of the windshield, more effectively than it would otherwise be removed by the momentum of the arm and blade alone.

Another object of the invention is to provide a snow-removing device which can be economically manufactured and assembled, which can be quickly and conveniently installed and/or removed and which remains securely in consistent operation substantially without deterioration and without any requirement for replacement of parts.

Other objects and advantages of the invention will become apparent after the description hereinafter set forth is considered in conjunction with the drawings annexed hereto.

In the drawings wherein a preferred embodiment of the invention is exemplified:

Figure 1 is a front elevational view of a windshield showing an arm and blade associated therewith and the device, embodying the invention, applied to the arm;

Figure 2 is a side elevational view of a particular type of wiper blade unit carried by a wiper arm showing the device attached to the arm;

Figure 3 is an elevational view of the device as applied to an arm showing the manner in which the impact member alternately strikes the arm; and Figure 4 is an elevational view of the support unit or assembly carrying a shaft on which the knocker is mounted.

Referring more particularly to the drawings, a wiper arm unit generally designated 1 is pivoted at 2 below a windshield 3 for directing a blade unit 4 carried by the arm back and forth across a portion of the windshield. The device embodying the invention is generally designated 5 and although it may be made for attachment to either blade or arm unit it is preferably constructed for detachable connection with an arm unit as illustrated. The device may, of course, be mounted at any other desirable location on the arm.

The arm unit includes an inner section 6 adapted for attachment to a drive shaft for oscillating the arm and an outer section 7 provided with a fitting 8 for connection with a connector 9 on the blade unit for pivotally connecting the latter to the arm. The outer section 7 of the arm is preferably made from bar stock, generally rectangular in cross section.

The blade unit includes a flexible blade 10 and a pressure device 11, the latter comprising a pair of secondary yokes 12 having their ends operatively connected to the blade and a primary yoke 13 having its ends pivoted to the secondary yokes. This type of blade is suitable for wiping both flat and curved surfaces, but is primarily adapted to wipe a curved windshield. In this type or kind of blade, as alluded to above, snow or ice, depending on weather conditions, may accumulate between and about the yokes and blade, and occasionally about the pivotal connection between the units, to such an extent that the blade unit will not function as well as when free of such accumulations. The device 5, as pointed out above, is primarily adapted for attachment to the arm for maintaining a blade, of the kind just referred to, in good working order, but is also suitable for removing ice or snow from other types of arms or blade units.

The device embodying the invention may be designed and constructed in various ways, but as exemplified herein includes a support unit preferably in the form of a clamp and impact means preferably in the form of a knocker 14. The device is preferably attached to the arm at a location relatively close to the pivotal connection between the units so as to take full advantage of the momentum imparted thereto by the drive shaft.

More specifically in this regard, the support is comprised of a pair of substantially corresponding complementary clamping elements 15 which are connected together by a rivet 16 which extends through holes provided therefor in the upper extremities of the elements. The upper end of each element is preferably provided with a semicylindrical formation 17, and these cooperate to form seats which jointly support a shaft on which the knocker is pivotally or rockably mounted.

The shaft includes a relatively large head 18 at one end, a cylindrical portion 19, a reduced cylindrical portion 20 and a relatively small head 21 at its other end. The reduced cylindrical portion 20 is clamped between the formations 17 and the portion 19 extends through a hole 22 in the upper part of the impact member. The impact member, shaft and support are preferably assembled by inserting the reduced portion 20 and head 21 of the shaft through the hole in the member until the head 18 abuts the member so the member is supported on the cylindrical portion 19 of the shaft. The reduced cylindrical portion 20 is then placed between the formations 17, and the rivet 16 extended through the clamping elements, after which the rivet is upset to secure the components together. The formations 17 thus embrace the reduced portion of the shaft and are located between the head 21 and a shoulder formed between the two cylindrical portions to prevent axial movement of the shaft relative to such formations. It should be obvious that means other than that illustrated may be used to mount the impact means on the support for movement with respect thereto. A washer 23 is preferably mounted on the cylindrical portion 19 of the shaft between the impact member and the support to maintain the member and support in spaced relation to enable the member to freely swing clear of the support.

Any means suitable for the purpose may be utilized to readily detachably connect the support to a component of a wiper apparatus, but as disclosed herein the lower extremities of the clamping elements are made yieldable and disposed in a normal diverging relationship. The lower ends of these extremities are preferably provided with corresponding channel formations or jaws 24.

A fastening means, preferably comprising a screw 25 and a nut 26, is employed to operatively connect the lower yieldable extremities of the clamping elements for applying a clamping action thereto. More specifically in this regard the screw has a head engaging one of the elements and a shank extending through holes provided therefor in the elements, with the nut engaging a threaded portion of the screw so that by manipulating the screw the yieldable extremities can be moved relative to one another to cause the jaws to firmly grip the outer section of the arm 7, as illustrated in Figures 2 and 3, to maintain the support in a stable, erect or perpendicular position with respect to the longitudinal axis of the arm. It will be noted that the nut is disposed in abutting relationship to one of the jaws 24, in order to prevent the nut from turning when the screw is manipulated to bring the jaws together or effect their separation. When the screw is loosened the yieldable extremities will automatically spread apart to assist in releasing the jaws from the arm. The head of the screw is preferably slotted to facilitate manipulation thereof.

If desired, the lower extremities of the clamping elements could be fashioned to clamp onto the primary yoke of the blade unit shown or onto a rigid back blade; or separate means could be utilized to connect the elements to any one of the yokes or the arm unit.

The impact means or knocker 14 may be designed and constructed in various ways, including an integral casting, but as shown is comprised of a plurality of corresponding superimposed planar elements 27 which are secured together by suitable fastening means, such as a pair of rivets 28. More specifically in this regard, each element is preferably made to include a pair of corresponding wings or triangular portions 29 and 30 joined together by a bridge or connecting portion 31. The bridge of each element is preferably provided with an offset portion 32 having an aperture therein which defines a part of the hole 22 in the impact means which receives the shaft. With this arrangement, the wings form a bifurcation which receives the arm in order that inner edges 33 and 34 adjacent the outer ends of the wings may alternately strike and shock the arm for the purpose described. The wings are separated by an arcuate notch or opening which is of a size to afford clearance to permit sufficient swinging or rocking movement of the knocker to produce a forceful shock when striking the arm. The size, weight, shape and composition of the knocker may, of course, be varied.

In view of the foregoing, it will be manifest that when the arm and blade are in the generally horizontal position shown in Figure 1, the knocker will fall by gravity so that the edge 33 of the wing 29 will rest on the arm. When the arm is actuated by the drive shaft to swing the arm clockwise to the vertical position shown by the dotted lines, the knocker will rock so that the opposite edge 34 of the wing 30 will strike the arm and produce vibrating shocks to the units for the purpose described. This striking usually occurs at the ends of the oscillating strokes of the arm, but may also occur whenever there is any appreciable or abrupt interruption in the speed or direction of travel of the arm sufficient to rock the knocker. It will be noted that the shaft carrying the knocker is disposed substantially parallel to the longitudinal axis of the arm and that the knocker is arranged for movement in a plane substantially parallel to the support and transverse to the longitudinal axes of the shaft and arm in order to impart the desired shock to the wiper apparatus.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. In a device of the class described and in combination, a support provided with means for attachment to a portion of a windshield wiper blade-and-arm assembly, an impact member movable with relation to said support means and movable with relation to said assembly, said impact member being operatively related to said support means, and means whereby said impact member is constrained to move generally in a fixed and limited predetermined path toward and from a plane normal to the windshield and generally parallel to the longitudinal axis of said arm-and-blade assembly, said impact member being free to move in the direction of movement of said arm-and-blade assembly at speeds either greater or less than the speed of oscillation of said assembly with relation to a windshield, said impact member being adapted to transmit to said assembly and to any snow or other extraneous matter adhering thereto inertial shock tending to separate such matter from said assembly upon reversal of the direction of movement of said assembly.

2. In a device of the class described and in combination a support member readily and securely attachable and detachable with relation to a portion of a windshield wiper arm-and-blade assembly, said device having an impact member operatively related to said support member and constrained by said support member to travel in a path predetermined with relation to said support member and to said assembly, said impact member being disposed to strike a portion of said arm-and-blade assembly upon relative movement of said arm-and-blade assembly and said impact member.

3. Means for automatically removing snow or other extraneous matter from a windshield wiper arm-and-blade assembly comprising an impact member connected to and propelled by said assembly to transmit the force of its momentum into inertial shock to said wiper blade upon occurrence of irregularities in travel of said assembly.

4. Means for automatically removing snow or other extraneous matter from a windshield wiper arm-and-blade assembly comprising an impact member connected to and propelled by said assembly to transmit the force of its momentum into inertial shock to said wiper blade upon reversal of the direction of travel of said assembly.

5. A device of the kind described comprising a support provided with means for detachably connecting the support to a movable component of a wiper apparatus, and impact means movably carried by said support for striking a part of the apparatus when the component is moved in a predetermined direction.

6. In combination: a wiper arm unit and means connecting a wiper blade unit thereto for movement back and forth on a windshield, and impact means mounted on one of the units in spaced relation to the connecting means and being freely movable with respect to the units to strike said one unit whenever any change in the direction of the travel of the blade unit is sufficient to cause such striking.

7. In combination: a wiper arm and means connecting a wiper blade thereto for movement back and forth on a windshield, and impact means mounted on the arm in spaced relation to the connecting means for freely striking same whenever there is any appreciable change in the direction of movement of the arm sufficient to produce such striking.

8. A device of the kind described comprising a support and impact means, said support having means for attaching the device to a movable wiper component, and means for supporting the impact means for free movement relative to the support for striking the component when applied thereto and the latter is actuated.

9. A device of the kind described comprising a support and means for attaching the support to a movable wiper component, and impact means mounted on the support for movement with respect thereto and provided with spaced abutments for straddling and alternately shocking such a component when the component is moved back and forth in a conventional manner.

10. In combination: windshield wiper apparatus adapted for movement back and forth across a portion of a windshield, and impact means carried by said apparatus for free movement with respect thereto and having portions located on opposite sides of a part of the apparatus for imparting intermittent shocks thereto when the apparatus is moved as aforesaid in a conventional manner.

11. In combination: a windshield wiper arm unit, a support unit carried by the arm unit, and impact means mounted for free movement on the support unit and having portions straddling one of the units for imparting shock thereto.

12. In combination: a windshield wiper assembly comprising a wiper arm and a blade, a support secured to the assembly in a position substantially perpendicular to the longitudinal axis of the arm, a shaft carried by the support and disposed in a position substantially parallel to the arm, and impact means in the form of a weight mounted on the shaft for free rockable movement in a plane substantially transverse to the longitudinal axes of the arm and shaft for imparting shock to the assembly when the latter is installed for movement back and forth across a windshield.

13. A device for the purpose described comprising an elongate support and an impact member rockably mounted adjacent one end of the support for movement in a plane substantially parallel to the support, and means provided adjacent the other end of the support for readily attaching the support to a movable wiper component.

14. The structure defined in claim 13, in which said means comprises a pair of jaws and a fastener for applying a clamping action to the jaws.

References Cited in the file of this patent

UNITED STATES PATENTS

| | | |
|---|---|---|
| 1,030,546 | Sharkey | June 25, 1912 |
| 1,695,326 | Folberth et al. | Dec. 18, 1928 |
| 1,752,400 | Sund | Apr. 1, 1930 |
| 2,025,888 | Olivero | Dec. 31, 1935 |
| 2,246,740 | Lethbridge | June 24, 1941 |
| 2,284,844 | Rappl | June 2, 1942 |
| 2,306,980 | Roberts | Dec. 29, 1942 |
| 2,794,203 | Oishei | June 4, 1957 |